United States Patent [19]
Fan

[11] Patent Number: 5,860,824
[45] Date of Patent: Jan. 19, 1999

[54] EXTENSION DEVICE FOR MOUNTING IN AUTOMOBILE CIGARETTE LIGHTER HOLDER

[76] Inventor: Eagle Fan, No. 30 Lu-Chang, Lu-Chang Li, Chu-Pei City, Hsin-Chu Hsien, Taiwan

[21] Appl. No.: 837,122

[22] Filed: Apr. 14, 1997

[51] Int. Cl.⁶ .................................................. H01R 13/15
[52] U.S. Cl. ......................... 439/265; 439/669; 439/165; 439/534
[58] Field of Search .................................... 439/259, 265, 439/669, 165, 534, 542

[56] References Cited

U.S. PATENT DOCUMENTS

| | | | |
|---|---|---|---|
| 4,109,988 | 8/1978 | Olson | 439/265 |
| 5,704,812 | 1/1998 | Moji | 439/265 |

*Primary Examiner*—Gary Paumen
*Attorney, Agent, or Firm*—Ostrolenk, Faber, Gerb & Soffen, LLP

[57] ABSTRACT

An extension device adapted to be mounted in the automobile cigarette lighter holder, includes an adaptor sized and configured to be fit into the automobile cigarette lighter holder, an end holder for holding a mobile phone, a power outlet section arranged between the adaptor and the end holder and connected thereto by means of a first and a second connectors both of which are capable to rotate about two orthogonal axes to allow the adjustment of spatial location of the mobile phone. The adaptor has a central bore inside which a plug, serving as the negative contact, is received and spring biased to be contact engageable with the negative contact of the cigarette lighter holder. The adaptor also has a plurality of flutes formed on a side surface, inside each of which a resilient strip is received to serve as a positive contact. The strip has a U-shaped end. An adjusting ring is movably engaged on the adaptor, having a wedging face in camming engagement with the U-shaped end of the resilient strip so that by moving the adjusting ring, the camming action between the wedging face and the resilient strip forces the strip to expand outward and is thus secured inside the cigarette lighter holder. A speaker may be provided inside the power outlet section and in signal connection with the mobile phone.

13 Claims, 6 Drawing Sheets

EXTENSION DEVICE FOR MOUNTING IN AUTOMOBILE CIGARETTE LIGHTER HOLDER

FIELD OF THE INVENTION

The present invention relates generally to an extension device adapted to be mounted in an automobile cigarette lighter holder for mechanically supporting and electrically connecting to an electrical appliance, such as a mobile phone, inside the automobile.

BACKGROUND OF THE INVENTION

Automobiles, especially passenger cars, are usually provided with a cigarette lighter for example on the dashboard. The cigarette lighter is an electric device which receives electrical energy from the automobile electricity system and provides a high temperature thermal output. To provide electricity to the cigarette lighter, the automobile dashboard is provided with a cigarette lighter holder which is in electrical connection with the automobile electricity system. The holder is in the form of a blind bore defining a positive contact and a negative contact respectively at the bottom and the side thereof, while the cigarette lighter is a plug-like member having a positive contact and a negative contact defined at the front tip and the side thereof to be in engagement with the corresponding contacts of the holder so as to establish electrical connection therebetween. Since the cigarette lighter holder is in electrical connection with the automobile electricity system, it is also used as a power outlet of the automobile electricity system to which electrical or electronic appliances may be attached.

Currently, there are two different specifications of the cigarette lighter holder adapted in cars from different manufacturers, of which the inside diameter of the bore is 20 mm and 22 mm respectively. Due to the difference in the specifications of the cigarette lighter holders, adaptors of two different specifications are needed in order to match these different specification cigarette lighter holders. This not only increases the cost of wholesale inventory, but is also troublesome in identifying the specific specification of the cigarette lighter holder.

Furthermore, since the connection between the cigarette lighter holder and an electrical or electronic appliance is provided by the simple insertion of a plug-like adaptor into the bore of the cigarette lighter holder, disengagement of the adaptor from the cigarette lighter holder may occur by being accidentally impacted or pulled, especially when vibration or shock occurs during the operation of the automobile.

One of the most commonly used electronic appliances that is powered via the cigarette lighter holder is a mobile phone which, usually, has to be held by hand in communication operation. This is very dangerous for a driver has to use one hand to hold the phone and control the steering wheel with only the other hand. Traffic accidents may thus occur. To overcome such a problem, mobile phone holders for holding the mobile phone inside a car and allowing ready operation without hand holding the phone are available in the market. These currently-available mobile phone holders are usually fixed to for example the dashboard of the car by means of adhesive pads or screws which damage the dashboard aesthetically once the holder is removed.

Thus it is desirable to have an extension device for mounting to a cigarette lighter holder which not only allows a secure engagement with the cigarette lighter holder, but also provides an end holder for holding thereon for example a mobile phone to allow a driver to use the mobile phone without hand holding the phone.

SUMMARY OF THE INVENTION

The principal object of the present invention is to provide an extension device for mounting to an automobile cigarette lighter holder which may be accommodated in automobile cigarette lighter holders of different specifications to provide a very secure engagement therewith.

Another object of the present invention is to provide an extension device for mechanically mounting to and electrically connecting to an automobile cigarette lighter holder, comprising an end holder for holding thereon a mobile phone so that no damage to the interior decoration of the automobile may be done in holding the mobile phone.

A further object of the present invention is to provide an extension device for mounting to and electrically connecting to an automobile cigarette lighter holder for mounting the mobile phone in a spatial location adjustable manner.

A further object of the present invention is to provide an extension device for mounting to and electrically connecting to an automobile cigarette lighter holder for holding thereon a mobile phone, a speaker being provided on extension device and in communication with the mobile phone so that a user may simply use the mobile phone without moving the mobile phone closer to the ears.

In accordance with the present invention, to achieve the above objects, there is provided an extension device adapted to be mounted in the automobile cigarette lighter holder, comprising an adaptor sized and configured to be fit into the automobile cigarette lighter holder, an end holder for holding a mobile phone, a power outlet section arranged between the adaptor and the end holder and connected thereto by means of a first and a second connectors both of which are capable to rotate about two orthogonal axes to allow the adjustment of spatial location of the mobile phone. The adaptor has a central bore inside which a plug, serving as the negative contact, is received and spring biased to be contact engageable with the negative contact of the cigarette lighter holder. The adaptor also has a plurality of flutes formed on a side surface, inside each of which a resilient strip is received to serve as a positive contact. The strip has a U-shaped end. An adjusting ring is movably engaged on the adaptor, having a wedging face in camming engagement with the U-shaped end of the resilient strip so that by moving the adjusting ring, the camming action between the wedging face and the resilient strip forces the strip to expand outward and is thus secured inside the cigarette lighter holder. A speaker may be provided inside the power outlet section and in signal connection with the mobile phone.

BRIEF DESCRIPTION OF THE DRAWINGS

The present invention will be better understood from the following description of a preferred embodiment thereof, with reference to the attached drawings, wherein:

FIG. 4A is an enlarged view of the circled portion designated 4A in FIG. 4;

DETAILED DESCRIPTION OF THE PREFERRED EMBODIMENT

Figure 1:
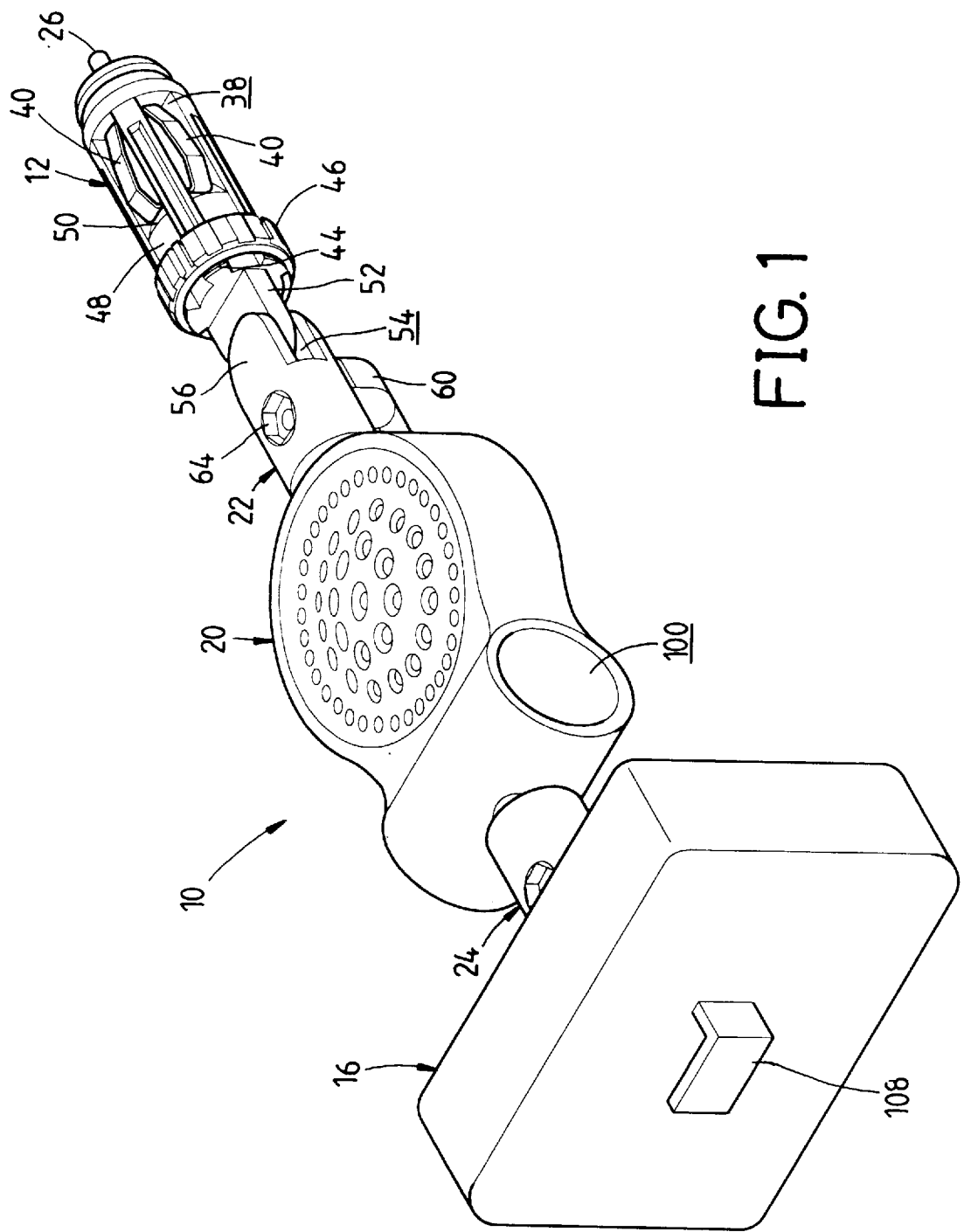
FIG. 1 is a perspective view showing an extension device constructed in accordance with the present invention.
Figure 2:
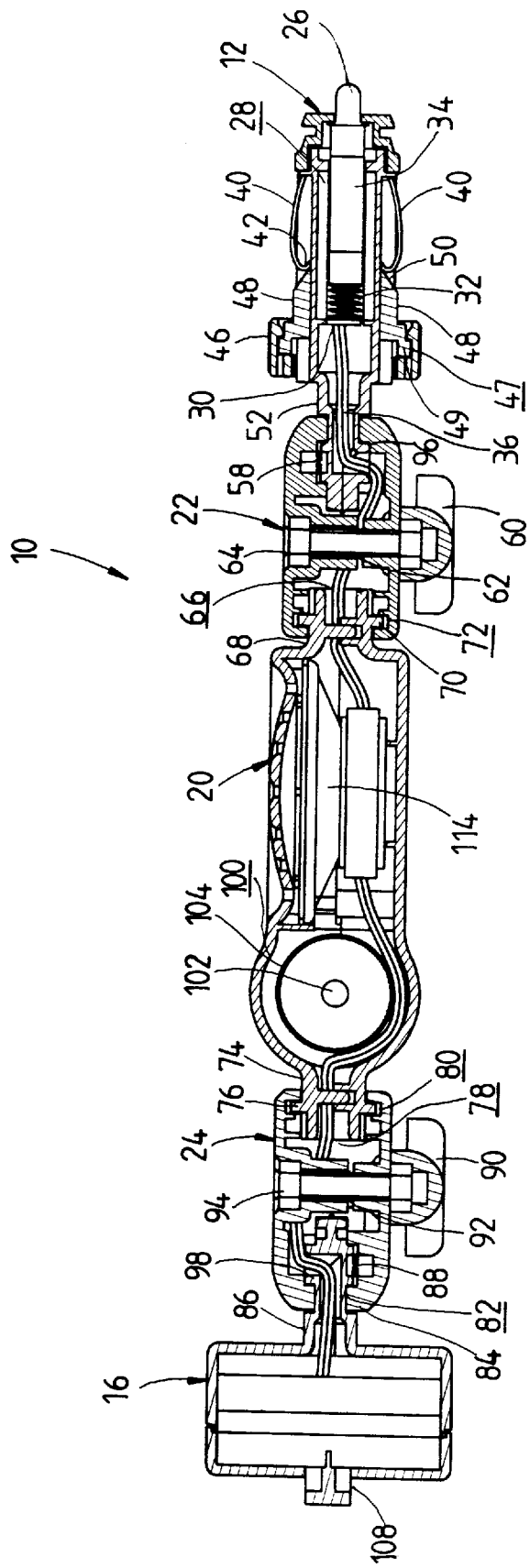
FIG. 2 is a cross-sectional view of the extension device of the present invention.
Figure 3:
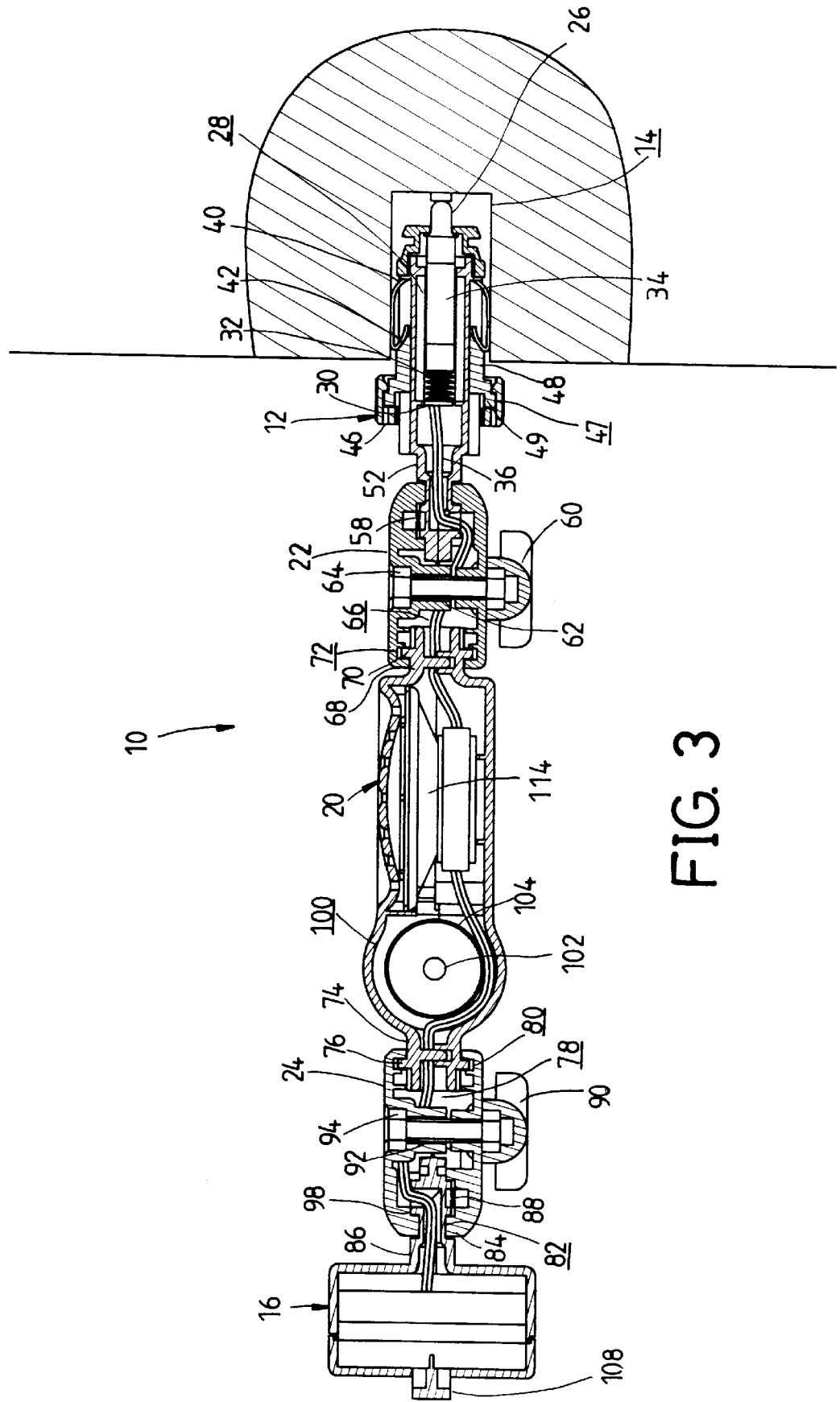
FIG. 3 is also a cross-sectional view showing the extension device of the present invention mounted in an automobile cigarette lighter holder.

With reference to the drawings and in particular to FIGS. 1 and 2, which show, respectively, a perspective view and a cross-sectional view of an extension device, generally designated with reference numeral 10, constructed in accordance the present invention, the extension device 10 comprises an adaptor 12 configured and sized to be fit into an automobile cigarette lighter holder 14 (see FIG. 3), an end holder 16 adapted to hold and support thereon an article, such as a mobile phone 18 (see FIG. 5), and a power outlet section 20 arranged between the adaptor 12 and the end holder 16 and rotatably connected thereto by means of a first connector 22 and a second connector 24.

To be accommodated in the automobile cigarette lighter holder 14, which is in general a cylindrical bore in configuration, the adaptor 12 is shaped as a cylindrical member having a first, central axis with an electrical positive contact in the form of a plug 26 provided on a proximal axial end thereof. For the provision of the positive contact 26, the adaptor 12 is formed with a central bore 28 with a reduced opening at the proximal end of the adaptor 12 for receiving an expanded end of the plug contact 26 therein with the plug 26 extending out of the adaptor 12 at the proximal end thereof and thus holding the plug contact 26 at the proximal end of the adaptor 12.

The bore 28 is sealed at an inboard location by a conductive piece 30 which is securely fixed inside the bore 28 and spaced from the proximal end with a spring 32 made of a resilient and conductive material and a fuse 34 interposed between the expanded end of the plug contact 26 and the conductive piece 30. The spring 32 serves to bias and hold the plug contact 26 to be at least partially out of the adaptor 12 and also provides a conductive path for electricity from the plug contact 26 to the conductive piece 30 from which the electricity is supplied to the power outlet section 20 and the end holder 16 by means of wires 36.

A plurality of flutes 38 are formed on the cylindrical surface of the adaptor 12, extending in the axial direction from a distal end of the adaptor 12 along a portion of the length of the adaptor 12 to be spaced inward from the positive contact 26. Preferably and as illustrated in the embodiment shown, the adaptor 12 has four such flutes 38 equally spaced from each other, namely every two adjacent flutes 38 are spaced at an angle of 90 degrees. Each of the flutes 38 receives an electrical negative contact in the form of a resilient strip or leaf spring 40 having an inward bent end 42 located in the proximity of the distal end of the adaptor 12 and defining a U-shaped configuration which serves as a camming section to be further described.

The distal end of the adaptor 12 is provided with external threading 44 to which an adjusting ring 46 which comprises an inner threading is engaged. The threading engagement between the adjusting ring 46 and the adaptor 12 allow the adjusting ring 46 to move in the axial direction of the adaptor 12 by being rotated about the adaptor 12. The adjusting ring 46 comprises an inner circumferential groove 47 into which an inner ring 49 is received to be rotatable about the first axis relative to the adjusting ring 46. The inner ring 49 comprises a plurality of camming tabs 48, four in the embodiment illustrated, extending axially therefrom and each received within one of the flutes 38 to have a sloped end face 50 in camming or wedging engagement with the U-shaped end 42 of the strip contact 40 so that by rotating the adjusting ring 46 to have adjusting ring 46 move axially, the camming tabs 48 of the inner ring 49 is moved axially along the flutes 38 and the camming engagement between the sloped faces 50 of the camming tabs 48 and the U-shaped ends 42 of the strip contacts 40 forces the strip contacts 40 to be elastically deformed and radially outward expanded.

Figure 5:
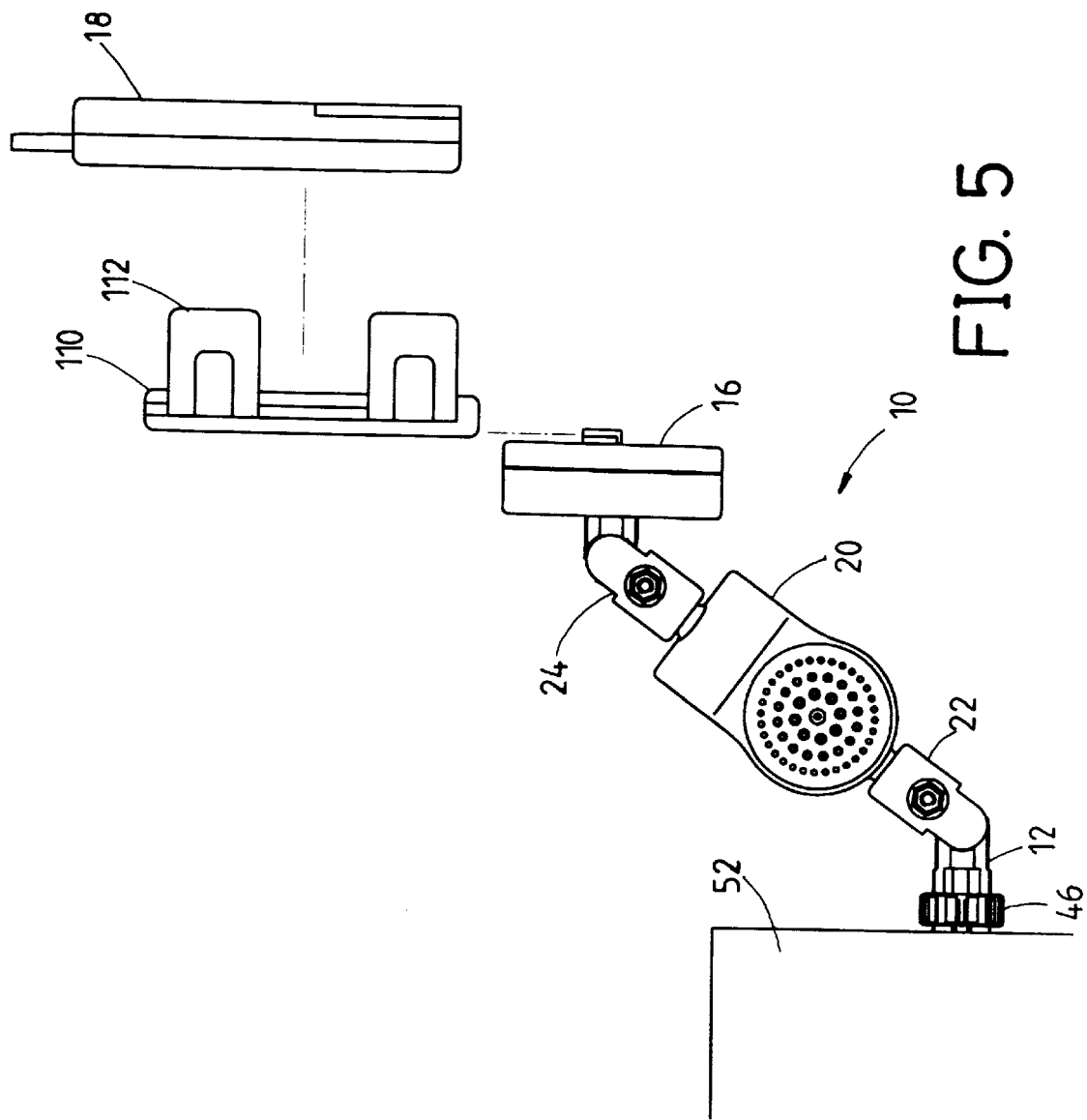
FIG. 5 is a side elevational view showing a mobile phone held by the extension device of the present invention which is mounted to the cigarette lighter holder, wherein the mobile phone is shown detached from the end holder of the extension device.

The radial deformation of the outward expansion is determined by the distance of axial movement of the adjusting ring 46 along the adaptor 12. The radial deformation of outward expansion leads in a secure contact engagement between the outward expanded portion of the strip contacts 40 and the inside surface of the bore of the cigarette lighter holder 14. By properly adjusting or rotating the adjusting ring 46 relative to the adaptor 12, a secure and firm engagement is achieved between the adaptor 12 and the cigarette lighter holder 14 which soundly holds the extension device 10 of the present invention in the cigarette lighter holder 14 provided on an automobile dashboard 52, as shown in FIG. 5. Thus, the adaptor 12 allows the extension device 10 of the present invention to be fixed to the automobile cigarette lighter holders of different specifications by using the adjusting ring 46 to expand the strip contacts 40 to different extent and thus securing the adaptor 12 within the bore of the cigarette lighter holder 14.

Figure 4:
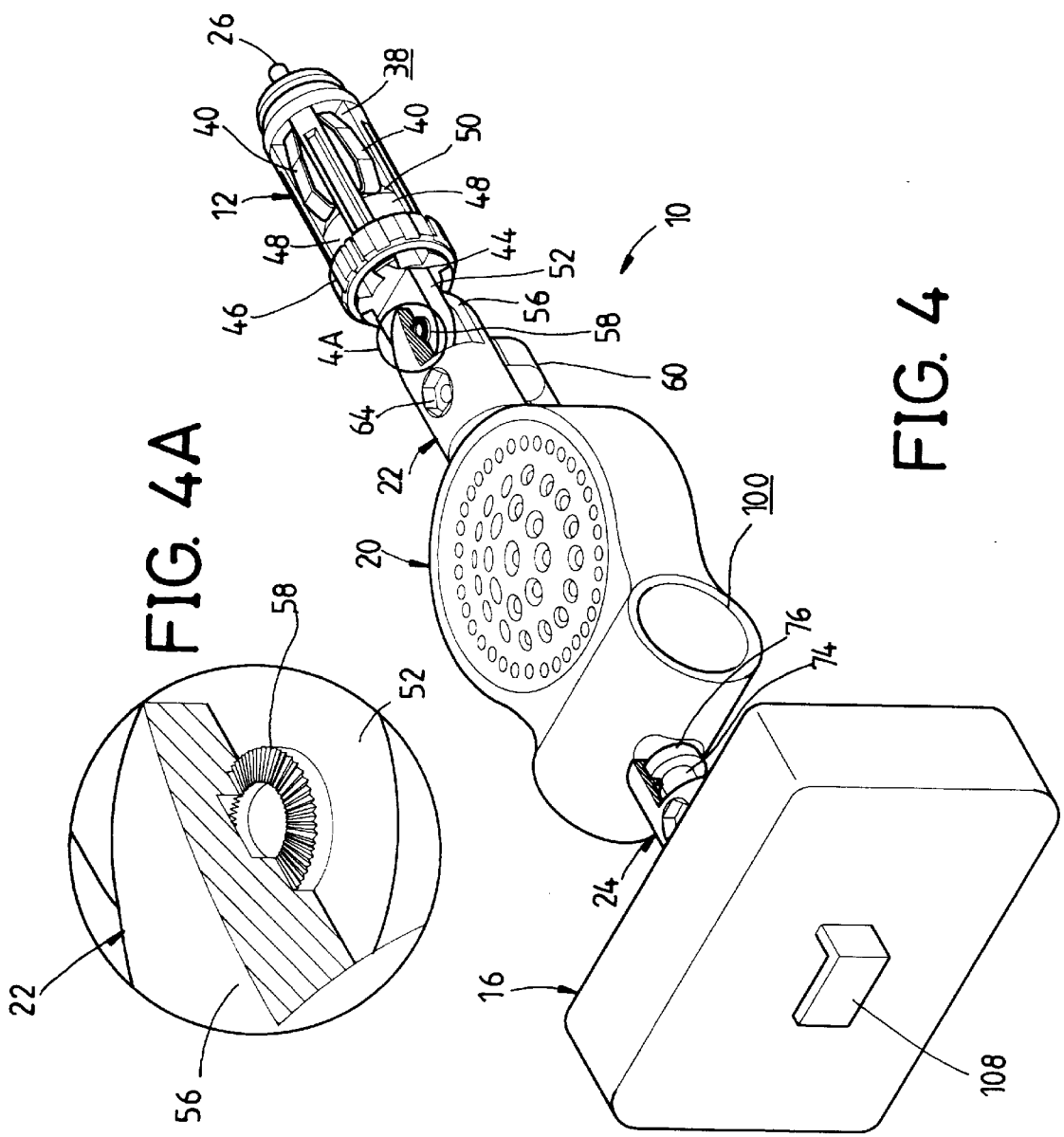
FIG. 4 is also a perspective view of the extension device of the present invention with portions broken to show the inside structure.

The adaptor 12 comprises an end extension 52 at the distal end which is received within a slot 54 defined by two spaced walls 56 formed on a proximal end of the first connector 22 to define a knuckle joint which allows the first connector 22 to be rotatable about a second axis which is substantially normal to the first axis. A ratchet clutch 58 is provided in the knuckle joint and concentric with respect to the second axis, see FIGS. 4 and 4A, which allows the first connector 22 to be positionable at any desired angular location relative to the adaptor 12 about the second axis. A control knob 60 which comprises a threaded section 62 engaged by a nut 64 is provided to control the tightness of the ratchet clutch 58 and thus securing the first connector 22 relative to the adaptor 12 at a selected angular position.

The first connector 12 comprises a central bore 62 formed at a distal end thereof for receiving therein a proximal axle 64 of the power outlet section 20 which extends in a third, central axis substantially normal to the second axis to allow the power outlet section 20 to be rotatable about the third axis with respect to the first connector 22. The third axis is located at the same plane as the first axis is, which plane is normal to the second axis so that the first and third axes may be coincident with each other at one of the angular positions that the first connector 22 may be located relative to the adaptor 12.

The proximal axle 64 of the power outlet section 20 is provided with a circumferential flange 70 which is movably received within a circumferential groove 72 formed inside the central bore 66 for retaining the proximal axle 64 of the power outlet section 20 within the central bore 66 of the first connector 22.

The power outlet section 20 further comprises a distal axle 74 extending in a direction opposite to the proximal axle 68 along the third axis, having a circumferential flange 76 formed thereon. Corresponding to the distal axle 74 and the circumferential flange 76, the second connector 24 has a central bore 78 to receive the distal axle 74 therein with the flange 76 retained within a circumferential groove 80 formed inside the bore 78 to allow the second connector 24 to be rotatable with respect to the power outlet section 20 about the third axis.

The second connector 24 is also provided with a slot 82 defined by two spaced walls 84 formed on distal end of the second connector 24 to rotatably receive therein an extension 86 of the end holder 16, defining a knuckle joint with a ratchet clutch 88 provided therebetween to control the angular position of end holder 16 relative to the second connector 24 about a fourth axis extending through the ratchet clutch 88 and normal to the third axis.

A control knob 90 having a threaded section 92 engaged by a nut 94 is provided to secure the ratchet clutch 88 so as to fix the angular position of the end holder 16 relative to the second connector 24 about the fourth axis.

Both knuckle joints of the first and second connectors 22 and 24 are provided with a flange and shoulder engagement, respectively designated at 96 and 98, between the extensions 52 and 86 of the adaptor 12 and the end holder 16 and the slots 54 and 82 of the first and second connectors 22 and 24 for retaining the extensions 52 and 86 within the slots 54 and 82.

Both the first and second connectors 22 and 24 and the power outlet section 20 are made hollow in structure so as to allow the wires 36 to extend therethrough from the conductive piece 30 of the adaptor 12 to the power outlet section 20 and the end holder 16.

The power outlet section 20 is provided with a lateral bore 100 having a positive contact 102 located on a closed bottom thereof and a negative contact 104 defined by an inner, circumferential wall, both the positive contact 102 and the negative contact 104 being in electrical connection with the positive and negative contacts of the cigarette lighter holder 14 by means of wires 36. The lateral bore 100 is to selectively receive an adaptor or plug of an electrical appliance (not shown) to supply electricity from the automobile electricity system to the electrical appliance.

Figure 6:
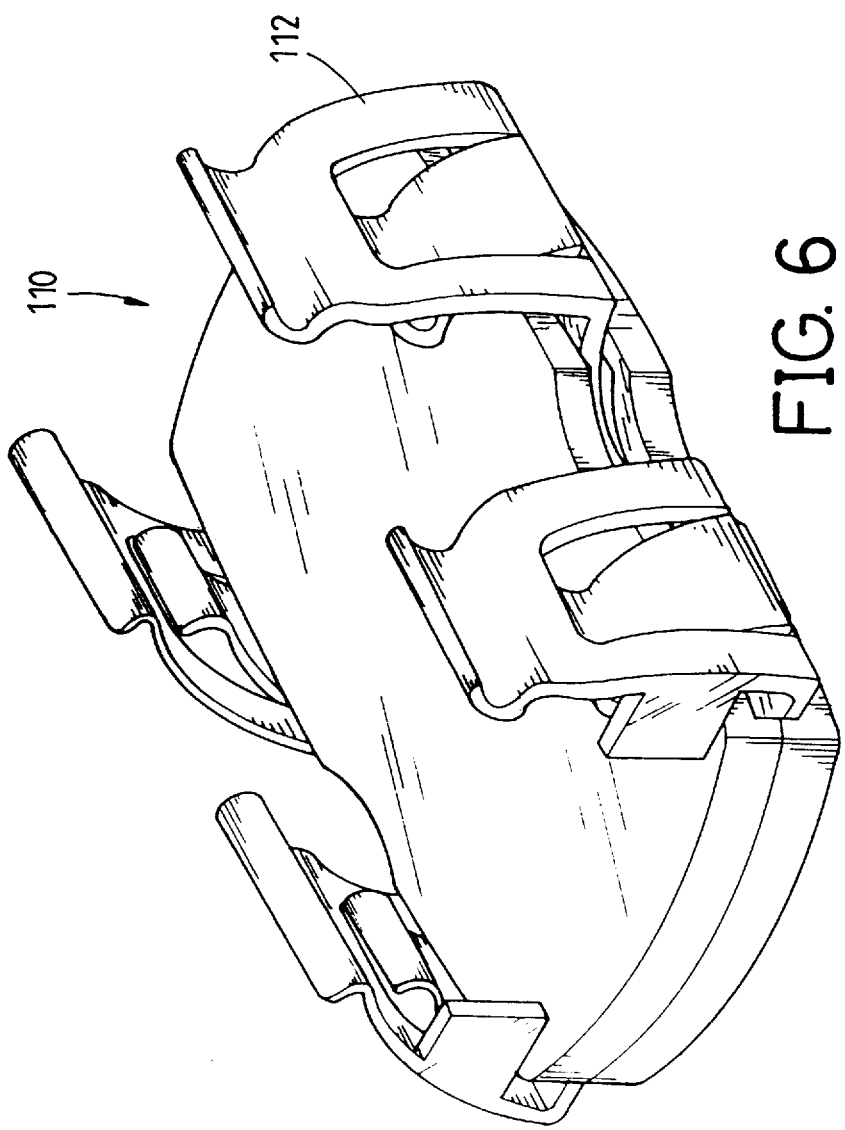
FIG. 6 is a perspective view showing a known mobile phone holder which is adapted to hold the mobile phone on the end holder of the extension device of the present invention.

The end holder 16 is provided with a hanger 108 on which a mobile phone holder 110, see FIGS. 5 and 6, which may be of any know design may be releasably attached. The mobile phone holder 110 is provided with a plurality of resilient members 112 which may be elastically deformed to receive and hold the mobile phone 18 therein.

Electrical connection means of any suitable forms, such as contact electrodes or plug and socket, may be provided on the end holder 16 and in electrical connection with the cigarette lighter holder 14 via the wires 36 for powering the mobile phone 18. Further the mobile phone 18 may be in signal connection with a speaker 114 disposed and held inside the power outlet section 20 and powered via the wires 36 which in cooperation with a microphone (not shown) also in signal connection with the mobile phone 18 allows a driver to use the phone 18 without hand holding the phone 18.

Although a preferred method has been described to illustrate the construction of the thermal insulation bottle in accordance present invention, it is apparent that changes and modifications in the specifically described method can be carried out without departing from the scope of the invention which is intended to be limited only by the appended claims.

What is claimed is:

1. An extension device adapted to be mounted to an automobile cigarette lighter holder which comprises a bore having an electrical negative contact located at a bottom of the bore and an electrical positive contact defined on an inner side surface of the bore, the extension device comprising an adaptor sized and configured to be fit into the bore of the cigarette lighter holder and an end holder mechanically coupled to the adaptor to be rotatable relative thereto about at least a first and a second axes so as to support an article on the cigarette lighter holder in a spatial location adjustable manner, the adaptor comprising a body having a proximal end and a distal end with a side surface extending therebetween, a plurality of flutes being provided on the side surface of the adaptor and extending in a first direction from the distal end to the proximal end, the adaptor comprising a plurality of strip-like members made of a resilient material received within the flutes, each of the strip-like members having an inward bent portion provided at a proximal end thereof and defining a U-shaped camming section, an adjusting member mounted on the adaptor to be movable in the first direction and having a plurality of camming tabs corresponding to and received within the flutes to have a wedging end formed on the camming tab in camming engagement with the camming section of the respect strip-like member in such a manner that the axial movement of the adjusting member drives the camming engagement between the wedging ends of the adjusting member and the camming sections of the strip-like members to elastically expand the strip-like members outward to establish a secure contact engagement with the inner side surface of the bore of the cigarette lighter holder.

2. The extension device as claimed in claim 1, wherein the adaptor comprises external threading on the distal end of the adaptor body and wherein the adjusting member comprises a ring having inner threading engageable with the external threading of the adaptor body so that rotating the ring about the adaptor body allows the ring to move axially relative to the adaptor, the ring having an inner circumferential groove within which an inner ring is rotatably received, the plurality of camming tabs being mounted to the inner ring and extending axially therefrom to be respectively received within the flutes.

3. The extension device as claimed in claim 1, wherein the adaptor body comprises a central bore having a reduced end opening at the proximal end thereof, a plug made of a conductive material and having an expanded end received within the central bore with the expanded end retained within the central bore by the reduced end opening to have the plug extending out of the adaptor body at the proximal end so as to serve as a negative contact engageable with the negative contact of the cigarette lighter holder and wherein the strip members that are received within the flutes are made of a conductive material so as to serve as positive contacts which are engageable with the positive contact of the cigarette lighter holder by being outward expanded by the axial movement of the adjusting member.

4. The extension device as claimed in claim 3, wherein the adaptor comprises a conductive piece fixed inside the central bore and spaced from the proximal end of the adaptor so as to receive therein a spring to bias and maintain the plug to extend out of the adaptor.

5. The extension device as claimed in claim 4, wherein the spring is made of a conductive material and wherein electrical wires are connected to the conductive piece and the strips received within the flutes and extending to the end holder to supply electricity from the cigarette lighter holder to the end holder for powering an electrical appliance held on the end holder.

6. The extension device as claimed in claim 5, wherein a fuse is received within the central bore of the adaptor and interposed between the spring and the plug.

7. The extension device as claimed in claim 3, wherein the mechanical coupling between the end holder and the adaptor comprises a power outlet section which is arranged between the adaptor and the end holder and is connected to the adaptor by means of a first connector rotatable about a first axis and a second axis and is connected to the end holder by means of a second connector rotatable about a third axis and a fourth axis, the power outlet section comprising a socket having positive and negative contacts in electrical connection with the positive contact and negative contact of the adaptor and adapted to receive and electrically connect to an electrical plug of an electrical appliance.

8. The extension device as claimed in claim 7, wherein the first connector comprises two spaced walls for receiving therebetween an extension from the distal end of the adaptor to define a knuckle joint rotatable about the first axis, a ratchet clutch being arranged associated with the knuckle joint for positioning the first connector at selected angular location relative to the adaptor about the first axis, a threaded rod being provided through the first connector with a nut engaging thereon for securing the ratchet clutch, and first connector comprises a central bore into which a first axle provided on the power outlet section is received to be rotatable about a second axis relative to the first connector so as to allow the power outlet section to be rotatable relative to the adaptor about the first and second axes.

9. The extension device as claimed in claim 7, wherein the second connector comprises two spaced walls for receiving therebetween an extension from the end holder to define a knuckle joint rotatable about the third axis, a ratchet clutch being arranged associated with the knuckle joint for positioning the second connector at selected angular location relative to the end holder about the third axis, a threaded rod being provided through the second connector with a nut engaging thereon for securing the ratchet clutch, and second connector comprises a central bore into which a second axle provided on the power outlet section is received to be rotatable about a fourth axis relative to the second connector so as to allow the power outlet section to be rotatable relative to the end holder about the third and fourth axes.

10. The extension device as claimed in claim 7, wherein the article held by the end holder is a mobile phone and wherein the power outlet section comprises a speaker received and fixed inside the power outlet section to be in signal connection with the mobile phone.

11. The extension device as claimed in claim 1, wherein the mechanical coupling between the end holder and the adaptor comprises an intermediate section which is arranged between the adaptor and the end holder and is connected to the adaptor by means of a first connector rotatable about a first axis and a second axis and is connected to the end holder by means of a second connector rotatable about a third axis and a fourth axis.

12. The extension device as claimed in claim 11, wherein the first connector comprises two spaced walls for receiving therebetween an extension from the distal end of the adaptor to define a knuckle joint rotatable about the first axis, a ratchet clutch being arranged associated with the knuckle joint for positioning the first connector at selected angular location relative to the adaptor about the first axis, a threaded rod being provided through the first connector with a nut engaging thereon for securing the ratchet clutch, and first connector comprises a central bore into which a first axle provided on the power outlet section is received to be rotatable about a second axis relative to the first connector so as to allow the power outlet section to be rotatable relative to the adaptor about the first and second axes.

13. The extension device as claimed in claim 11, wherein the second connector comprises two spaced walls for receiving therebetween an extension from the end holder to define a knuckle joint rotatable about the third axis, a ratchet clutch being arranged associated with the knuckle joint for positioning the second connector at selected angular location relative to the end holder about the third axis, a threaded rod being provided through the second connector with a nut engaging thereon for securing the ratchet clutch, and second connector comprises a central bore into which a second axle provided on the power outlet section is received to be rotatable about a fourth axis relative to the second connector so as to allow the power outlet section to be rotatable relative to the end holder about the third and fourth axes.

* * * * *